(12) United States Patent
Martino et al.

(10) Patent No.: US 12,391,381 B2
(45) Date of Patent: Aug. 19, 2025

(54) DRONE DELIVERY IMPROVEMENTS

(71) Applicants: Marc Gregory Martino, Westlake Village, CA (US); Maya Amitabha Spielman, Westlake Village, CA (US)

(72) Inventors: Marc Gregory Martino, Westlake Village, CA (US); Maya Amitabha Spielman, Westlake Village, CA (US)

( * ) Notice: Subject to any disclaimer, the term of this patent is extended or adjusted under 35 U.S.C. 154(b) by 566 days.

(21) Appl. No.: 17/140,428

(22) Filed: Jan. 4, 2021

(65) Prior Publication Data
US 2021/0229811 A1   Jul. 29, 2021

Related U.S. Application Data

(60) Provisional application No. 62/957,315, filed on Jan. 6, 2020.

(51) Int. Cl.
| | |
|---|---|
| *B64D 1/00* | (2006.01) |
| *B64D 1/12* | (2006.01) |
| *B64U 30/10* | (2023.01) |
| *B64U 50/13* | (2023.01) |
| *G06Q 10/083* | (2023.01) |
| *B64C 29/02* | (2006.01) |
| *B64U 10/25* | (2023.01) |

(Continued)

(52) U.S. Cl.
CPC .............. *B64D 1/12* (2013.01); *B64U 30/10* (2023.01); *B64U 50/13* (2023.01); *G06Q 10/083* (2013.01); *B64C 29/02* (2013.01); *B64U 10/25* (2023.01); *B64U 50/19* (2023.01); *B64U 2101/60* (2023.01)

(58) Field of Classification Search
CPC ...... G06Q 10/08; G06Q 50/28; G06Q 10/083; G05D 1/04; G05D 1/06; G05D 1/00; G01C 21/34; B64D 1/12; B64C 39/024; B64C 29/02; G08G 5/0069; G08G 5/025; B64U 2201/20; B64U 2101/00; B64U 2101/60; B64U 2201/00; B64U 50/38; B64U 2201/10; B64U 2101/64; B64U 2101/55; B64U 10/25; B64U 30/10; B64U 50/13; B64U 50/19
See application file for complete search history.

(56) References Cited

U.S. PATENT DOCUMENTS 9,524,648 B1 * 12/2016 Gopalakrishnan ... G08G 5/0069
10,078,808 B1 *  9/2018 Sibon ................... G05D 1/0676
(Continued)

*Primary Examiner* — Florian M Zeender
*Assistant Examiner* — Milena Racic
(74) *Attorney, Agent, or Firm* — Orbit IP

(57) ABSTRACT

A method of delivering goods uses a drone configured for vertical and horizontal flight. A customer can use a customer interface for purchasing a product. The customer also selects a drop zone location. At a base location, the product is placed within a packaging configured to be transported by the drone. The packaging is secured to the drone wherein the drone is configured to release the packaging by a release mechanism. The drone flies from the base location to the drop zone location where it hovers at a predetermined height above the drop zone location. The customer confirms to release the product where the package drops down to the customer for retrieval. The drone flies back to the base location to repeat the method of delivering goods. This method is faster than any other delivery method, it eliminates human to human interaction and minimizes drone tampering by customers and others.

19 Claims, 3 Drawing Sheets

(51) Int. Cl.
*B64U 50/19* (2023.01)
*B64U 101/60* (2023.01)

(56) References Cited

U.S. PATENT DOCUMENTS

| | | | | |
|---|---|---|---|---|
| 10,293,938 | B2* | 5/2019 | Thompson | G05D 1/0011 |
| 10,403,155 | B2* | 9/2019 | Kimchi | B64D 1/12 |
| 10,457,393 | B2* | 10/2019 | Thompson | B64D 1/22 |
| 10,510,036 | B1* | 12/2019 | Lisso | B65B 35/56 |
| 10,535,037 | B2* | 1/2020 | High | B64D 47/08 |
| 10,676,204 | B2* | 6/2020 | Lemarchand | B64D 33/04 |
| 10,839,336 | B2* | 11/2020 | Greiner | B64D 1/02 |
| 11,074,545 | B2* | 7/2021 | Winkle | B64D 11/0624 |
| 11,790,313 | B1* | 10/2023 | Clise | G06Q 10/0833 |
| | | | | 705/338 |
| 11,794,899 | B2* | 10/2023 | Wu | G08C 17/02 |
| 11,840,333 | B2* | 12/2023 | Sweeny | B26D 5/00 |
| 2015/0259078 | A1* | 9/2015 | Filipovic | G08B 13/1965 |
| | | | | 244/114 R |
| 2016/0068264 | A1* | 3/2016 | Ganesh | G05D 1/0676 |
| | | | | 701/4 |
| 2018/0107211 | A1* | 4/2018 | Schubert | G08G 5/0021 |
| 2018/0130017 | A1* | 5/2018 | Gupte | G01N 33/00 |
| 2018/0174102 | A1* | 6/2018 | Winkle | G06Q 10/08355 |
| 2018/0244404 | A1* | 8/2018 | Park | E01F 3/00 |
| 2018/0308367 | A1* | 10/2018 | Zhang | G08G 5/57 |
| 2019/0012640 | A1* | 1/2019 | Ferguson | G05D 1/0044 |
| 2019/0041852 | A1* | 2/2019 | Schubert | G06Q 10/0836 |
| 2019/0079509 | A1* | 3/2019 | Bosworth | G06Q 10/08355 |
| 2019/0100314 | A1* | 4/2019 | Prager | B66D 1/485 |
| 2020/0398999 | A1* | 12/2020 | Ortiz | G07C 9/00309 |
| 2021/0022536 | A1* | 1/2021 | Anderson | G06Q 10/0832 |
| 2022/0327552 | A1* | 10/2022 | Gong | G08G 5/0008 |
| 2023/0107899 | A1* | 4/2023 | Tian | B65G 67/08 |
| | | | | 705/28 |

* cited by examiner

DRONE DELIVERY IMPROVEMENTS

CROSS-REFERENCE TO RELATED APPLICATIONS

This non-provisional patent application claims priority to provisional patent application 62/957,315 filed on Jan. 6, 2020, the entire contents of which are fully incorporated herein with this reference.

DESCRIPTION

Field of the Invention

The present invention generally relates to delivering goods. More particularly, the present invention relates to using a drone to deliver goods where the drone remains at an unreachable height when releasing the goods, thereby preventing damage to the drone and eliminating human interaction and conflict.

Background of the Invention

Drone delivery will soon be commonplace among the United States population. However, companies are struggling with making drones large enough and strong enough to carry a variety of packages with varying sizes and weights. At the same time cannabis (pot, marijuana) and other related products are legal for sale statewide in certain states such as California and Colorado to name a few, and likely other states are to follow with legalization.

Currently, there are cannabis delivery companies that advertise they can deliver to your location within an hour. These companies use human drivers that personally deliver each purchase. However, these companies are plagued with employee problems. For example, to cut down on delivery time to eliminate coming back to the business location a driver might have on hand many thousands of dollars of product. It is very common for the driver to simply disappear with product thereby stealing thousands in merchandise. Also, drivers of cannabis have a high risk job delivering product to unscrupulous customers. Furthermore, drivers may be the target of theft and violence. For all these reasons, the cannabis delivery business model is very tough and expensive to maintain using human transportation of goods.

Furthermore, delivering medicines to contagious patients who may carry transmittable diseases also is problematic. Therefore, it would be best to remove the human to human contact when delivering such medicines and other related products.

Accordingly, there is a need for an improvement in such delivery methods. The present invention fulfills these needs and provides other related advantages.

SUMMARY OF THE INVENTION

A method of delivering goods, comprises the steps of: providing a drone, wherein the drone is configured for vertical and horizontal flight; providing a customer interface for purchasing a product by a customer; purchasing, by the customer using the customer interface, the product; selecting and/or accepting, by the customer using the customer interface, a drop zone location; at a base location, placing the product within a packaging configured to be transported by the drone, wherein the drop zone location and the base location are different locations; at the base location, securing the packaging to the drone, wherein the drone is configured to release the packaging by a release mechanism, the release mechanism at least partially attached to the drone; flying the drone carrying the packaging with the product from the base location to the drop zone location; hovering the drone at a predetermined height above the drop zone location; confirming with the customer to release the product; releasing the packaging by the release mechanism allowing the packaging with the product to drop down from the predetermined height to a ground level; and flying the drone back to the base location to repeat the method of delivering goods.

In other exemplary embodiments, the predetermined height may be at least 10, 25, 50 or 100 feet.

In other exemplary embodiments, the product including the packaging may be less than 0.1, 0.25, 0.5, 1.0, 1.5, 2.0, 2.5, 5.0 pounds.

In other exemplary embodiments, the step of confirming with the customer to release the product may comprise a pre-acceptance from the customer to automatically release the packaging with the product at the drop zone location upon drone arrival at the drop zone location.

In other exemplary embodiments, the step of confirming with the customer to release the product may comprise sending a wireless arrival notification to the customer and the customer sending a wireless package release authorization to the drone and/or base location for releasing the packaging with the product.

In other exemplary embodiments, the step of confirming with the customer to release the product may comprise the customer displaying a physical drop authorization configured to be read by a camera attached to the drone.

In other exemplary embodiments, the physical drop authorization may comprise a physical movement by the customer.

In other exemplary embodiments, the physical drop authorization may comprise displaying a scan code on a mobile device of the customer.

In other exemplary embodiments, after releasing the packaging to drop down by the release mechanism, the method may include utilizing a video camera on the drone, recording a period of time at least after the release of the packaging to record the customer retrieving the package.

In other exemplary embodiments, the customer interface may comprise a website interfaced with and communicated over an Internet, wherein the website is configured to process an order electronically.

In other exemplary embodiments, the customer interface may comprise a telephone call center configured to process an order verbally when the customer calls in to the telephone call center.

In other exemplary embodiments, the customer interface may comprise an application interfaced with and communicated on a smart device over the Internet, wherein the application is configured to process an order electronically. The smart device may comprise a smart phone, a smart tablet, smart watch, a smart verbal base station, a laptop computer or a desktop computer.

In other exemplary embodiments, it may include the step of providing the drone with a still camera and/or video camera, the camera configured for taking a picture and/or video of the customer retrieving the product after the step of releasing the packaging.

In other exemplary embodiments, the drone may comprise at least three propellers and a flying wing, wherein the at least three propellers are configured for vertical flight in a hover and for horizontal flight utilizing the flying wing for lift, wherein the flying wing is aligned along a longitudinal axis of the drone and wherein a rotation axis of each of the at least three propellers are also aligned with the longitudinal axis.

In other exemplary embodiments, the packaging may be configured to release and drop from a rear of the drone during vertical flight in a hover.

In other exemplary embodiments, the drone may comprise a GPS transmitter configured for the base location to locate the position of the drone during use or after a drone crash.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

To solve the problems of the prior art, the inventors have devised a new drone delivery service that focuses on carrying very light weight products such as cannabis, prescription pills, medicine and the like which reduces the associated risks of theft and human safety. Carrying only "light weight" products can simplify the design of the drone and the efficiency of the drone such that a single drone base location can service a large coverage area of delivery.

Figure 1:
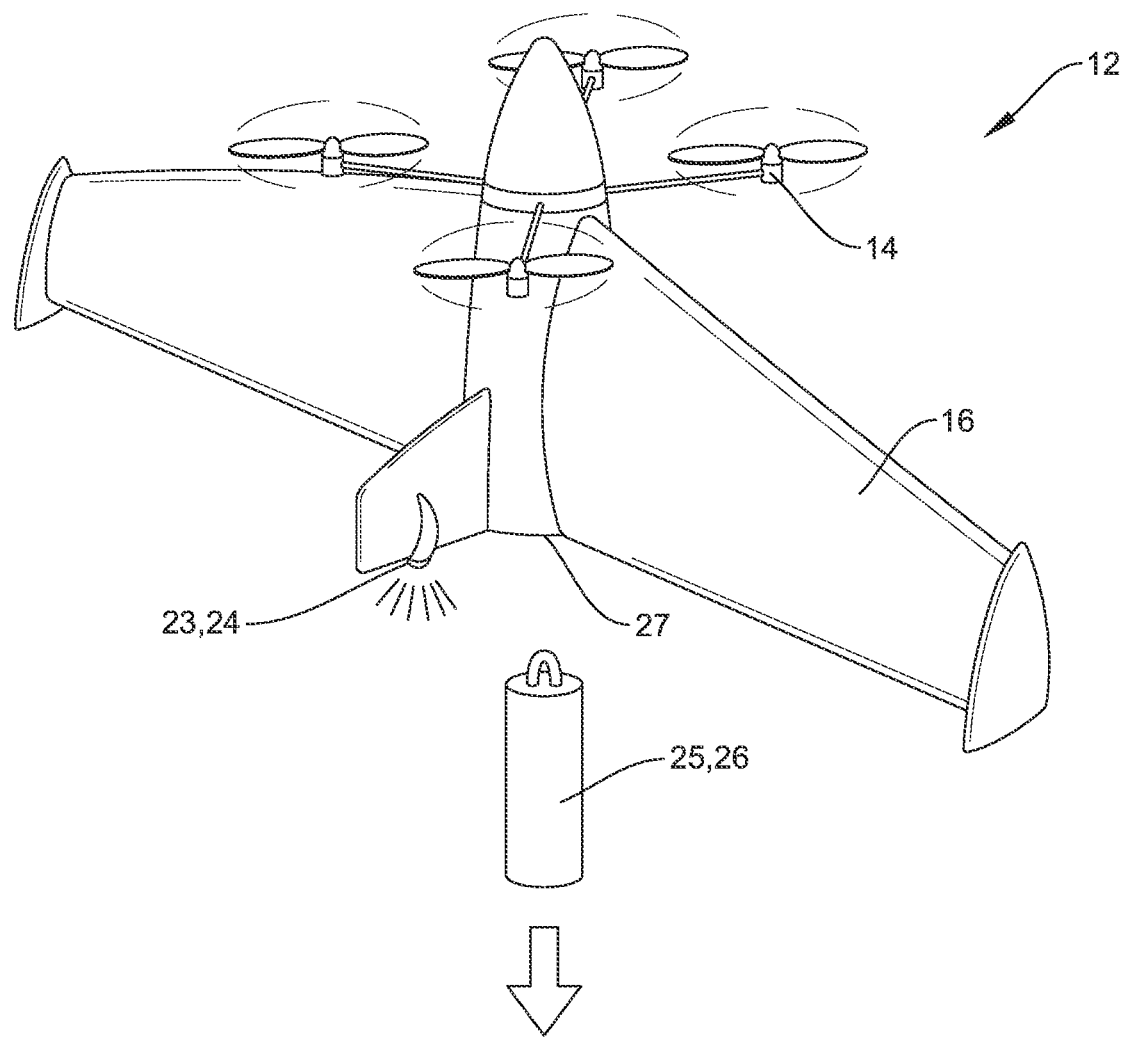
FIG. 1 is a perspective view of an exemplary drone used in the present invention.
Figure 2:
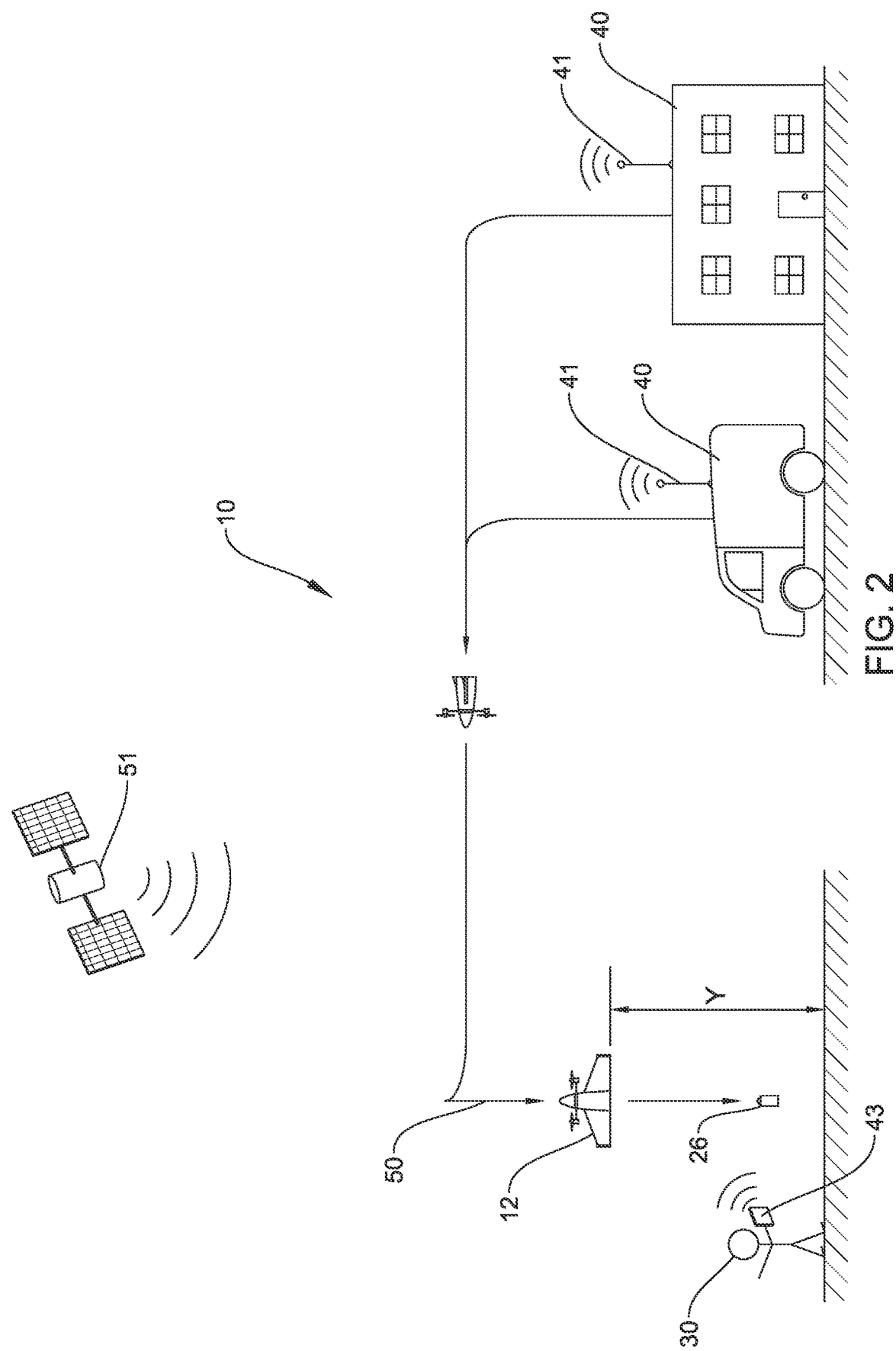
FIG. 2 is a simplified overview of the method of the present invention.

For example, FIGS. 1 and 2 show just one embodiment of a drone designed to carry light weight product. The drone can be a 3-10 (or more) propeller (shown here as a four propeller) drone that is able to take off and land vertically. The lower body of the drone is designed as large flying wing such that the drone can transition into a forward flight orientation taking advantage of the aerodynamic lift generated by the flying wing which then reduces power consumption and increases delivery range significantly. The flying wing can be made simply from an EPP foam that is easily swapped out for new wings if the current wing becomes damaged. Once the drone reaches a delivery location, it will transition back into a hovering mode that are typical of hovering drones. Flight of the drone is controlled precisely due to the GPS that is common in modern drones of today.

To complete a consumer transaction, a user/customer would log into a webpage or smart phone application. The user would be able to purchase the products they desired and select a delivery drop zone location. The drop zone could be determined by allowing the user to see a map view of their selected area and then pin point a freely accessible and open space for the drone to arrive at that is close and easily accessible to their location. For example, if one was viewing their house, they could pin point their front lawn or their driveway. Once a delivery location was selected, it would be approved either manually by a delivery company employee or by the software itself verifying this was a safe drop zone.

The drone would then be fitted with the product and rise vertically to somewhere generally around 100-500 feet and fly to the drop zone following the topography and/or GPS while staying within certified drone heights but above trees, buildings and powerlines.

Once at a designated delivery location, the drone will transition into a hover and lower itself while still remaining above the ground at a predetermined height of around 10-50 feet. The predetermined height can be any height range within a range of 1-500 feet, such as at least 10, 15, 20, 25, 30, 35, 40, 45, 50, 55, 60, 65, 70, 75, 80, 85, 90, 95 or 100 feet. The lower the height the more accurate the drop. However, the higher the height the less chance the drone can be tampered with. For example, the drone might hover at 30-50 feet such that one cannot easily steal or interfere with the drone operations.

Once a drone is hovering, a text message, phone call or voicemail message can be sent to the user's smart device to indicate that the drone has arrived at the delivery location. Furthermore, upon when the drone takes off, a delivery pre-notification can be sent to give an estimated time of arrival such that the user can properly meet the drone at the right time.

Once the user reaches the drone delivery location, the user can send a signal either to a communications network or directly to the drone. For example, the user could send a text (or email) back to drop the product, such as texting a special delivery code or simply texting "drop". The drone would then release the container stored within to fall to the ground and the user would simply pick up the product. Again, because the cannabis (or any light weight product) is very light, the container containing the cannabis would also be very light. As shown here, the container could simply be a circular (or square) cardboard box that weighs very little. A servo or electromagnetic lock would hold the box in place during flight and then release when signaled.

There are several ways of alerting the drone to drop the package. For example, texts/emails have already been discussed. Alternatively, the user could call and leave a voicemail to drop the product. An automated service could even call the user and ask the user to press a button on their phone or say a word such as "drop" for the drone to release the product. Alternatively, the user could establish a Bluetooth connection directly with the drone to drop the product. As can be appreciated, there are many ways to send an electronic delivery drop signal to the drone.

The drone could also be fitted with a camera that would view the user. The user could display a scan code (i.e. image) on their phone that then signals the drone to drop the product. The user could perform a hand signal that the drone was trained to observe and verify.

The drone could also be programed to simply drop the product once it arrives at the location if that is what the user prefers. Such a pre-authorization release can be obtained at the time of purchase.

After dropping the product, the drone could send another signal that the product was dropped and head back to the base station. If the drone was fitted with a camera, it could record the product being dropped and even picked up by the user. If the user was not at the location, the drone can be programmed to wait a set period of time before returning to the base station still with the product. For example, the drone could hover for 5-10 minutes to allow sufficient time for the user to arrive at the drop zone and confirm receipt (drop) of the product. Alternatively, the drone could land and wait at the drop zone location or an alternative undisclosed location and wait for the customer to reach the drop zone location to save battery life.

As for the base station/location, the base station could be a fixed business location or could operate from a mobile unit such as a truck. A truck serving as a base station would be easy to locate in new areas such that coverage of a large area could quickly be established. The roof of the truck would serve as the landing pad for the various drones to come and go.

As can be appreciated, this new business model using drones to deliver light weight product eliminates a lot of risks associated with current delivery methods using human drivers. Furthermore, deliveries could be accomplished within minutes dramatically speeding up the delivery process. Finally, this delivery process would be very entertaining to the user to enhance their purchasing experience.

Referring to the drone, it would also be advantageous to make the battery easily replaceable. Therefore, when a drone arrives back, a fresh battery could easily be fitted and the drone sent back into service. This would reduce down time of any drone as many batteries could be ready for replacement.

Because the drone is delivering very light weight product, the drone itself can also be very light. This is advantageous if the drone was to experience a malfunction and fall from the sky. Due to most of the body of the drone being made of EPP foam, it would simply fall to the ground and not create any substantial damage, if any. One of the hurdles will be to get the legislature of any state to approve delivery of products via drones. However, this drone embodiment is perfectly designed for legalization due to its inherent design of safety and reduction of the risk of human injury to customers and sellers but also to the public with drones flying overhead.

The drone could also be fitted with a GPS locator such that downed drones could be recovered. The power supply for the GPS unit could come from the drone battery or be run from a secondary battery for redundancy.

The reference to light weight products is understood to mean products including the packaging that would not cause injury to others or to the product itself if dropped from a height of around 10-100 feet. Therefore, such overall product and packaging weights should be kept below 0.1, 0.25, 0.5, 1.0, 1.5 and 2 lbs. The product packaging itself can also be tailor made to comprise crumple zones or padding such that impact loads would be reduced to people below or to the product. As a novelty, the product packaging can resemble that of a bomb to increase consumer entertainment and enjoyment.

As can be appreciated, the drone designed for delivering light weight product is novel in its design. The drone combines the best attributes of vertical and horizontal flight to achieve long delivery ranges. Also, storing the product within the body of the drone also provides for an easy and cost effective solution of transporting light weight products. Furthermore, the idea of only selling light weight product combined with dropping the product from a hovering height out of easy reach is also novel as it allows the exchange of goods and services while reducing the risk of human transportation and interaction. Also, the idea of having the user send a verification signal to drop the product at the agreed upon drone delivery location is also novel.

In one embodiment, the present invention includes a method of delivering a product, comprising the steps of: providing a drone; providing a customer interface for purchasing a product by a customer, the customer selecting and/or accepting a drop zone location; securing the product to the drone at a base location, the product including the packaging being less than 0.1, 0.25, 0.5, 1.0, 1.5 or 2 pounds; flying the drone carrying the product to the drop zone location; hovering the drone at a predetermined height above the drop zone location; confirming with the customer to drop the product; and flying the drone back to the base location.

Best shown in FIG. 2 is an overview of a method of delivering goods 10. Also, as best shown in FIG. 1 is a drone 12 that can used in said method of delivering goods 10. The drone 12 is configured for both vertical and horizontal flight. The drone has at least three (herein shown four) propellers and electric motors 14. When the drone is in the vertical position as shown in FIG. 1, it will hover for vertical flight like a typical drone as is known to those skilled in the art. In other words, the various electric motors and propellers can selectively speed up and down to control all aspects of flight such that additional movable flaps are not needed as is with many other aircraft such as airplanes. Thereafter, the drone can transition to horizontal flight utilizing aerodynamic lift generated by the flying wing 16. By utilizing the flying wing 16, less overall power consumption is used thereby enabling much longer flight distances. Once again, when flying horizontally utilizing the flying wing, the various electric motors and propellers can selectively speed up and down to control all flight aspects.

Figure 3:
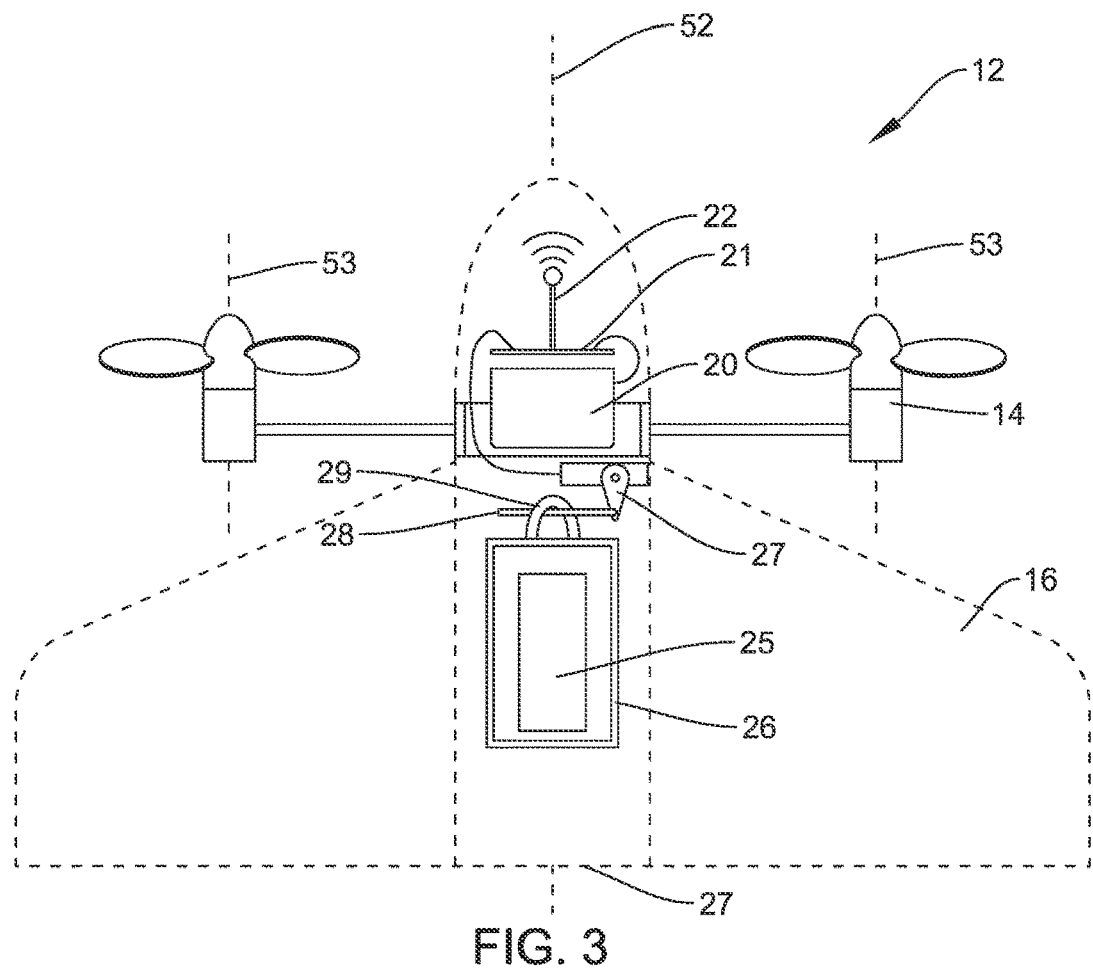
FIG. 3 a side sectional view of the drone of FIG. 1.

When looking at FIGS. 1 and 3, one can see that the flying wing 16 is aligned along a longitudinal axis 52 of the drone. Likewise, a rotation axis 53 of each of the at least three propellers are also aligned with the longitudinal axis 52. In this manner, when the drone is hovering the propellers and electric motors 14 are producing thrust downward. Then, after the drone transitions to forward flight, the propellers and electric motors 14 are producing thrust horizontally and the flying wing is creating lift. This particular embodiment of the drone 12 is best for the method of the present invention. This is because the drone 12 can hover in a manner similar to various multi-rotor RC aircraft known to those skilled in the art. Then, when the drone is in horizontal flight, the flying wing 16 is used to create aerodynamic lift (similar to how all airplanes work) which means the propellers and electric motors 14 don't have to use a large amount of energy and greater distances can be reached.

As is known to those skilled in the art, and referring to FIG. 3, the drone will include a battery power 20, a computer board 21 for processing, a transmitter and receiver 22 and all the various parts and pieces needed to make a drone controllable from a distance by a remotely disposed transmitter/receiver 41 at the base station 40. Alternatively, the drone can be programmed to fly autonomously using a predetermined flight path such that external control is not needed. Such a drone can fly using various GPS signals 51 and topography of the flight path as these techniques are known to those skilled in the art.

The product 25 is disposed within a packing 26. The packaging 26 is configured to release and drop from a rear 27 of the drone during vertical flight in a hover. There are many ways to easily release the packaging 26. One such method is using a servo 27 that simply removes a feature 28 from a receiver 29 formed as part of the packaging 26. If the packaging is stuck inside the drone after being released, the drone can be programmed to shake while hovering to help the packaging 26 fall.

Optionally, the drone can include a still camera 23 and/or video camera 24. The camera may be configured for taking a picture and/or a video of the customer 30 retrieving the packaging 26 after the step of releasing the packaging. This can be used to verify that the customer received the package.

The drone can be configured to send a live video feed back to an operator at the base location. The operator can visually see if the customer is ready to receive the dropped package or if there is a problem, such as the drone not being in the correct drop zone location. The operator may step in and manually control the drone at any time along its flight path.

The drone may comprise a GPS transmitter/locator 22 configured for the base location to locate the position of the drone during use or after a drone crash.

Figure 4:
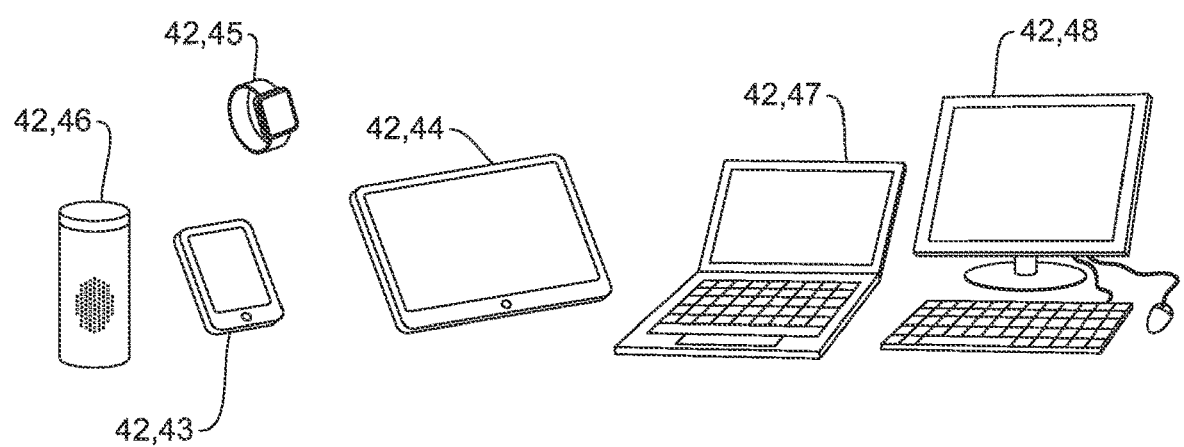
FIG. 4 illustrates a multitude of devices that a customer may use to access the method of the present invention.

The customer 30 can purchase the goods using a customer interface 42. The customer interface can take many forms. For example, the customer interface may be a website interfaced with and communicated over an Internet, wherein the website is configured to process an order electronically. Alternatively, the customer interface may comprise a telephone call center configured to process an order verbally when the customer calls in to the telephone call center. Alternatively, the customer interface may comprise an application interfaced with and communicated on a smart device, wherein the application is configured to process an order electronically. As shown in FIG. 4, the smart device may comprise a smart phone 43, a smart/electronic tablet 44, smart watch 45, a smart verbal base station 46, a laptop computer 47, or a desktop computer 48 and the like.

When the customer places an order a drop zone location 50 is determined. There may be several ways this can be accomplished. For example, the customer can enter in an address to which a map is brought up. The customer can then exactly determine the location where the drone is to fly to for releasing the package. The accuracy of current GPS and mapping units can obtain such a location to within a few feet. For example, the customer can choose to have the drone release the package in their front yard, back yard or in their driveway. The system of the present invention can approve of such a drop zone automatically or the drop zone location can be reviewed by a worker to ensure that the drop zone location is safe and practicable for such deliveries.

As shown in FIG. 2, the drone leaves from the base station 40, which can be a building, van or other location. Once the drone reaches the drop zone location 50, the drone will hover at a predetermined height Y above the drop zone location. The height Y may be anything above 10 feet, such as 30-50 feet. This height is high enough that the drone will likely not be tampered with during deliveries.

Once the drone gets the confirmation with the customer to release the product the drone releases the packaging to drop down to the ground. The drone can use its camera 23, 24 to record the customer picking up the packaging as confirmation. Thereafter, the drone flies back to the base location to repeat delivering more orders to other customers.

To allow the drone to release the package, many methods may be used. For example, a pre-acceptance from the customer to automatically drop the product and packaging at the drop zone location upon drone arrival can be obtained at the time of purchase. Alternatively, the drone/base station can send a wireless arrival notification (text, email, voicemail) to the customer and the customer in return can send a wireless package release authorization to the drone once they arrived at the drop zone location. Alternatively, the customer may display a physical drop authorization configured to be read by the camera attached to the drone. The physical drop authorization may comprise a physical movement by the customer such as a sequence of hand movements or comprise a scan code displayed on the mobile device of the customer that can be read by the drone's camera.

Currently, prior art drone delivery methods utilize the drone landing on the ground for delivering the goods. This creates a multitude of problems. First, a person can break and/or destroy the drone while it is landed. Second, a person may run, fall or trip into the drone and get injured. Pets may also attack the drone resulting injury to drone and animal alike. This application teaches, that for light weight and/or indestructible items, it is better if the drone never actually lands but remains out of reach of people on the ground. The purchased goods can be dropped from a safe height preventing such problems.

Although several embodiments have been described in detail for purposes of illustration, various modifications may be made to each without departing from the scope and spirit of the invention. Accordingly, the invention is not to be limited, except as by the appended claims.

What is claimed is:

1. A method of delivering goods, comprising the steps of:
providing a drone, wherein the drone is configured for vertical and horizontal flight;
providing a customer interface for purchasing a product by a customer;
wherein the product consists essentially of cannabis, prescription pills or medicine, and wherein the product is configured not to cause injury to the customer or to the product itself when dropped from a height of at least 10 feet and up to 100 feet;
purchasing, by the customer using the customer interface, the product;
selecting and/or accepting, by the customer using the customer interface, a drop zone location;
at a base location, placing the product within a packaging configured to be transported by the drone, wherein the drop zone location and the base location are different locations;
wherein the product including the packaging is less than 1.0 pound;
at the base location, securing the packaging to the drone, wherein the drone is configured to release the packaging by a release mechanism, the release mechanism at least partially attached to the drone;
flying the drone carrying the packaging with the product from the base location to the drop zone location;
hovering the drone at a predetermined height above the drop zone location;
confirming with the customer to release the product through the customer interface;
wherein the step of confirming with the customer to release the product is performed when the drone has reached the drop zone location or after the drone has reached the drop zone location;
releasing the packaging by the release mechanism allowing the packaging with the product to drop down from the predetermined height to a ground level; and
flying the drone back to the base location to repeat the method of delivering goods.

2. The method of claim 1, wherein the predetermined height is at least 25 feet.

3. The method of claim 1, wherein the product including the packaging is less than 0.5 pounds.

4. The method of claim 1, wherein the step of confirming with the customer to release the product comprises sending a wireless arrival notification to the customer and the customer sending a wireless package release authorization to the drone and/or base location for releasing the packaging with the product.

5. The method of claim 1, wherein the step of confirming with the customer to release the product comprises the customer displaying a physical drop authorization configured to be read by a camera attached to the drone.

6. The method of claim 5, wherein the physical drop authorization comprises a physical movement by the customer.

7. The method of claim 5, wherein the physical drop authorization comprises displaying a scan code on a mobile device of the customer.

8. The method of claim 1, wherein after releasing the packaging to drop down by the release mechanism, utilizing a video camera on the drone, recording a period of time at least after the release of the packaging to record the customer retrieving the package.

9. The method of claim 1, wherein the customer interface comprises a website interfaced with and communicated over an Internet, wherein the website is configured to process an order electronically.

10. The method of claim 1, wherein the customer interface comprises a telephone call center configured to process an order verbally when the customer calls in to the telephone call center.

11. The method of claim 1, wherein the customer interface comprises an application interfaced with and communicated on a smart device over the Internet, wherein the application is configured to process an order electronically.

12. The method of claim 11, wherein the smart device comprises a smart phone, a smart tablet, smart watch, a smart verbal base station, a laptop computer or a desktop computer.

13. The method of claim 1, including the step of providing the drone with a still camera and/or video camera, the camera configured for taking a picture and/or video of the customer retrieving the product after the step of releasing the packaging.

14. The method of claim 1, wherein the drone comprises at least three propellers and a flying wing, wherein the at least three propellers are configured for vertical flight in a hover and for horizontal flight utilizing the flying wing for aerodynamic lift, wherein the flying wing is aligned along a longitudinal axis of the drone and wherein a rotation axis of each of the at least three propellers are also aligned with the longitudinal axis.

15. The method of claim 14, wherein the packaging is configured to release and drop from a rear of the drone during vertical flight in a hover.

16. The method of claim 1, wherein the drone comprises a GPS transmitter configured for the base location to locate the position of the drone during use or after a drone crash.

17. The method of claim 1, wherein the predetermined height is at least 10 feet.

18. The method of claim 1, wherein the step of confirming with the customer to release the product is performed when the customer has reached the drop zone location or after the customer has reached the drop zone location.

19. A method of delivering goods, comprising the steps of:
providing a drone, wherein the drone is configured for vertical and horizontal flight;
providing a customer interface for purchasing a product by a customer;
wherein the product consists essentially of cannabis, prescription pills or medicine, and wherein the product is configured not to cause injury to the customer or to the product itself when dropped from a height of at least 10 feet and up to 100 feet;
wherein the customer interface comprises an application interfaced with and communicated on a smart device over the Internet, wherein the application is configured to process an order electronically;
wherein the smart device comprises a smart phone, a smart tablet, smart watch, a smart verbal base station, a laptop computer or a desktop computer;
purchasing, by the customer using the customer interface, the product;
selecting and/or accepting, by the customer using the customer interface, a drop zone location;
at a base location, placing the product within a packaging configured to be transported by the drone, wherein the drop zone location and the base location are different locations;
wherein the product including the packaging is less than 2 pounds;
at the base location, securing the packaging to the drone, wherein the drone is configured to release the packaging by a release mechanism, the release mechanism at least partially attached to the drone;
flying the drone, either manually from the base location and/or autonomously using a global positioning system, carrying the packaging with the product from the base location to the drop zone location;
hovering the drone at a predetermined height above the drop zone location;
wherein the predetermined height is at least 10 feet and simultaneously or thereafter confirming with the customer to release the product through the customer interface;
releasing the packaging by the release mechanism allowing the packaging with the product to drop down from the predetermined height to a ground level; and
flying the drone back to the base location to repeat the method of delivering goods.

* * * * *